US012788065B2

(12) United States Patent
Wright et al.

(10) Patent No.: US 12,788,065 B2
(45) Date of Patent: Nov. 10, 2026

(54) HEATING CHAMBER FOR AEROSOL GENERATION DEVICE

(71) Applicant: JT International SA, Geneva (CH)

(72) Inventors: Alec Wright, Guildford (GB); Andrew Robert John Rogan, Forres (GB); Madoka Hasegawa, Nyon (CH)

(73) Assignee: JT International SA, Geneva (CH)

( * ) Notice: Subject to any disclaimer, the term of this patent is extended or adjusted under 35 U.S.C. 154(b) by 641 days.

(21) Appl. No.: 18/030,926

(22) PCT Filed: Oct. 8, 2021

(86) PCT No.: PCT/EP2021/077947
§ 371 (c)(1),
(2) Date: Apr. 7, 2023

(87) PCT Pub. No.: WO2022/074239
PCT Pub. Date: Apr. 14, 2022

(65) Prior Publication Data

US 2023/0371599 A1 Nov. 23, 2023

(30) Foreign Application Priority Data

Oct. 8, 2020 (EP) .................................... 20200899

(51) Int. Cl.
*A24F 40/46* (2020.01)
*A24F 40/20* (2020.01)
*G05D 15/00* (2006.01)

(52) U.S. Cl.
CPC .............. *A24F 40/46* (2020.01); *A24F 40/20* (2020.01); *G05D 15/00* (2013.01)

(58) Field of Classification Search
CPC .......... A24F 40/20; A24F 40/40; A24F 40/46; A61M 15/06; G05D 15/00
See application file for complete search history.

(56) References Cited

U.S. PATENT DOCUMENTS

2017/0055580 A1 3/2017 Blandino et al.
2017/0064996 A1 3/2017 Mironov
(Continued)

FOREIGN PATENT DOCUMENTS

CN 106455704 A 2/2017
CN 110403243 A * 11/2019 ............. A24F 40/46
(Continued)

OTHER PUBLICATIONS

CN-110403243-A (Machine Translation) [online], [retrieved on Aug. 7, 2025], retrieved from ESPACENET (https://worldwide.espacenet.com/) (Year: 2019).*
(Continued)

*Primary Examiner* — Philip Y Louie
*Assistant Examiner* — Yana B Krinker
(74) *Attorney, Agent, or Firm* — Lerner David LLP

(57) ABSTRACT

A heating chamber (11) for an aerosol generation device (1), the heating chamber (11) comprising: a compression element (111) comprising a thermally active material; and a reaction surface (112), wherein the heating chamber (11) is adapted to receive an aerosol substrate (2) between the compression element (111) and the reaction surface (112), and the compression element (111) is configured to compress the aerosol substrate (2) against the reaction surface (112), wherein the compression element (111) is configured to undergo displacement according to a temperature of the heating chamber (11) and a thermal response characteristic of a magnetic property of the thermally active material.

18 Claims, 7 Drawing Sheets

(56) References Cited

U.S. PATENT DOCUMENTS

| | | | |
|---|---|---|---|
| 2017/0079330 A1 | 3/2017 | Mironov et al. |
| 2020/0163384 A1 | 5/2020 | Rossoll et al. |
| 2020/0236999 A1 | 7/2020 | Mironov et al. |
| 2020/0375255 A1 | 12/2020 | Courbat et al. |

FOREIGN PATENT DOCUMENTS

| | | | |
|---|---|---|---|
| CN | 110621175 | A | 12/2019 |
| CN | 209732595 | U | 12/2019 |
| CN | 110891443 | A | 3/2020 |
| CN | 111031821 | A | 4/2020 |
| CN | 111109658 | A | 5/2020 |
| JP | S57168616 | A | 10/1982 |
| JP | 2018529322 | A | 10/2018 |
| WO | 2016096912 | A1 | 6/2016 |
| WO | 2017068100 | A1 | 4/2017 |

OTHER PUBLICATIONS

CN-110403243-A (Machine Translation) [online], [retrieved on Jan. 21, 2026], retrieved from ESPACENET (https://worldwide.espacenet.com/) (Year: 2019).*

International Search Report for Application No. PCT/EP2021/077947 mailed Jan. 5, 2022, pp. 1-3.

Search Report dated Dec. 30, 2025 from the Office Action for Chinese Application No. 202180069245.8 issued Jan. 1, 2026, pp. 1-3.

* cited by examiner

HEATING CHAMBER FOR AEROSOL GENERATION DEVICE

CROSS-REFERENCE TO RELATED APPLICATIONS

The present application is a national phase entry under 35 U.S.C. § 371 of International Application No. PCT/EP2021/077947 filed Oct. 8, 2021, published in English, which claims priority to European Application No. 20200899.1 filed Oct. 8, 2020, the disclosures of which are incorporated herein by reference.

TECHNICAL FIELD

The present invention relates to an aerosol generating device. The disclosure is particularly applicable to a portable aerosol generation device, which may be self-contained and low temperature. Such devices may heat, rather than burn, tobacco or other suitable aerosol substrate materials by conduction, convection, and/or radiation, to generate an aerosol for inhalation.

BACKGROUND

The popularity and use of reduced-risk or modified-risk devices (also known as vaporisers) has grown rapidly in the past few years as an aid to assist habitual smokers wishing to quit using traditional tobacco products such as cigarettes, cigars, cigarillos, and rolling tobacco. Various devices and systems are available that heat or warm aerosolisable substances as opposed to burning tobacco in conventional tobacco products.

A commonly available reduced-risk or modified-risk device is the heated substrate aerosol generation device or heat-not-burn (HNB) device. Devices of this type generate an aerosol or vapour by heating an aerosol substrate (i.e. consumable) that typically comprises moist leaf tobacco or other suitable aerosolisable material to a temperature typically in the range 150° C. to 300° C. Heating an aerosol substrate, but not combusting or burning it, releases an aerosol that comprises the components sought by the user but not the toxic and carcinogenic by-products of combustion and burning. In addition, the aerosol produced by heating the tobacco or other aerosolisable material does not typically comprise the burnt or bitter taste that may result from combustion that can be unpleasant for the user.

However, within such devices, the aerosol substrate is known to lose structural integrity during the heating process and may shrink and/or begin to release aerosolisable material. This may result in inconsistent heating of the aerosol substrate and adversely affect the aerosol generating properties of the device.

Furthermore, if a user removes the aerosol substrate from the device during the heating operation, there is a risk of the user contacting a hot portion of the aerosol substrate.

Therefore, an object of the present invention is to address one or more of these issues.

SUMMARY

According to a first aspect, the present disclosure provides a heating chamber for an aerosol generation device, the heating chamber comprising: a compression element comprising a thermally active material; and a reaction surface, wherein the heating chamber is adapted to receive an aerosol substrate between the compression element and the reaction surface, and the compression element is configured to compress the aerosol substrate against the reaction surface, wherein the compression element is configured to undergo displacement according to a temperature of the heating chamber and a thermal response characteristic of a magnetic property of the thermally active material.

Applying compression to the aerosol substrate according to a temperature of the heating chamber enables consistent heating and enables preventing the aerosol substrate from being removed while hot. Additionally, compression of an aerosol substrate while it is heated improves aerosol generation. Furthermore, the thermal response characteristic of the magnetic property is a passive response, and does not require control circuitry to control the displacement.

Optionally, the heating chamber further comprises a heating element arranged on or behind, or comprised within, the compression element. Optionally, the heating chamber further comprises a heating element arranged on or behind, or comprised within, the reaction surface. By providing a heating element on, behind or within the compression element and/or the reaction surface, the heating element remains close to the aerosol substrate throughout any displacement and compression, further improving consistency of heating.

Optionally, the reaction surface is a second compression element configured to undergo displacement according to a temperature of the heating chamber. By providing compression by two opposing elements, uniformity of compression in the aerosol substrate can be improved. Additionally, a range of motion for each compression element can be halved compared to the single compression element example. With a reduced range of motion, a thermally active material with reduced maximum magnetic field strength can be used, or a quantity of the thermally active material can be reduced.

Optionally, the heating chamber further comprises a magnetic interaction element comprising a first magnetic material, wherein: the thermally active material comprises a second magnetic material, the compression element is displaced in response to a change in a magnetic force between the first and second magnetic materials, at least one of the first and second magnetic materials has a threshold temperature at which the material undergoes a magnetic phase transition, and the heating chamber is configured to, during aerosol generation, raise the temperature of the heating chamber to an aerosol generation temperature above the threshold temperature. By providing a magnetic interaction element configured to interact with the thermally active material, and by designing the thermally active material to undergo a magnetic phase transition, the compression element can be configured to clearly move between an open position at which the aerosol substrate can be removed from the heating chamber and a closed position at which a compression force is applied to hold the aerosol substrate.

Optionally, the compression element is arranged between the magnetic interaction element and the reaction surface, one of the first and second magnetic materials is ferromagnetic up to a Curie temperature lower than the aerosol generation temperature, and the other of the first and second magnetic materials is paramagnetic above the Curie temperature. In this configuration, a magnetic force holds the compression element open in a low temperature state (below the Curie temperature), and the compression element does not inhibit adding or removing the aerosol substrate in the low temperature state.

Optionally, the magnetic interaction element is arranged on or behind, or comprised in, the reaction surface, and one of the first and second magnetic materials is antiferromagnetic up to a Neel temperature lower than the aerosol generation temperature, and the other of the first and second magnetic materials is ferromagnetic at the aerosol generation temperature. In this configuration, a magnetic force holds the compression element closed in a high temperature state (above the Neel temperature).

Optionally, the magnetic interaction element is arranged on or behind, or comprised in, the reaction surface, and one of the first and second magnetic materials is ferromagnetic up to a Curie temperature lower than the aerosol generation temperature, and the other of the first and second magnetic materials is diamagnetic. In this configuration, a magnetic force holds the compression element open in a low temperature state (below the Curie temperature).

Optionally, the heating chamber further comprises a resilient element configured to bias the compression element towards or away from the reaction surface. The resilient element can be configured to oppose a force applied due to the magnetic property of the thermally active material, in order to bias the compression element in two different directions depending on the temperature in the heating chamber.

According to a second aspect, the present disclosure provides an aerosol generation device comprising a heating chamber as described above.

According to a third aspect, the present disclosure provides an aerosol generation system comprising a heating chamber as described above and an aerosol substrate arranged between the compression element and the reaction surface.

According to a fourth aspect, the present disclosure provides a method of generating an aerosol comprising: providing an aerosol substrate between the compression element and the reaction surface of a heating chamber as described above; operating the heating chamber to raise a temperature of the heating chamber to an aerosol generation temperature; extracting an aerosol from the heating chamber; operating the heating chamber to lower a temperature of the heating chamber to an aerosol substrate release temperature; and removing the aerosol substrate from the heating chamber.

DETAILED DESCRIPTION

Figure 1:
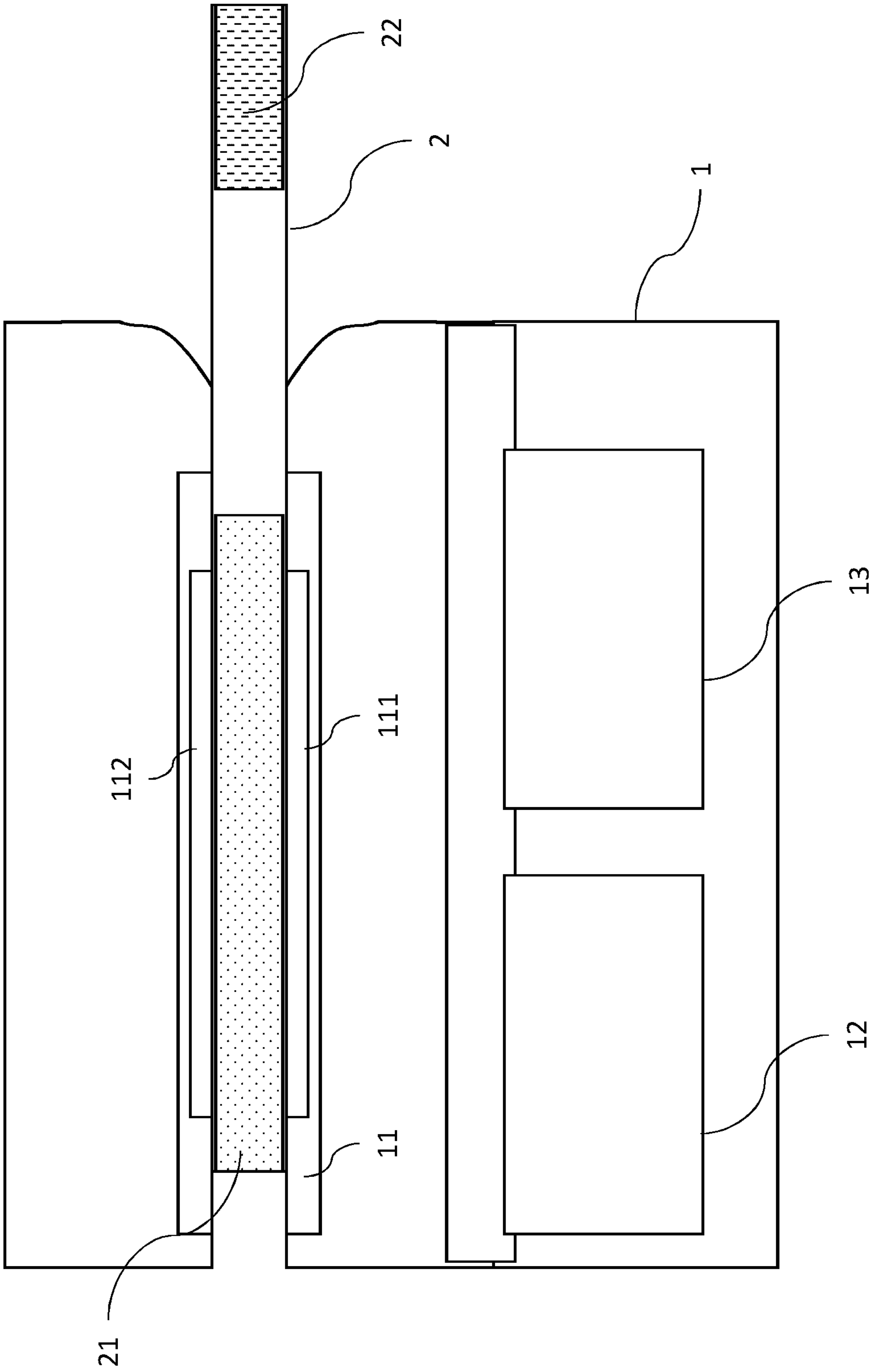
FIG. 1 is a schematic cross-section of an aerosol generation device that has received a consumable.

FIG. 1 is a schematic cross-section of an aerosol generation device incorporating a heating chamber according to the present disclosure.

The aerosol generation device 1 comprises the heating chamber 11, an electrical power supply 12 and control circuitry 13. The control circuitry 13 controls supply of electrical power from the supply 12 to the heating chamber 11 in order to heat a consumable 2 that has been received in the heating chamber 11.

The heating chamber 11 comprises a compression element 111 and a reaction surface 112. The consumable 2 is received between the compression element 111 and the reaction surface 112, and the compression element 111 is configured to undergo displacement in order to compress the consumable 2 against the reaction surface 112.

Specifically, the consumable comprises at least an aerosol substrate 21 which is arranged in the heating chamber 11 for aerosol generation. The consumable may, for example, take the form of a cigarette in which the aerosol substrate is contained in a wrapper. The cigarette may additionally comprise a mouthpiece 22 comprising a filter. In this configuration, the aerosol substrate 21 is heated to generate an aerosol, and a user may inhale the aerosol through the mouthpiece 22.

In order to facilitate inhaling of the aerosol, the aerosol generation device may comprise an air flow channel with an inlet and outlet at different points on a housing of the aerosol generation device, where the air flow channel extends through the heating chamber 11.

In particular, the aerosol generation device may comprise an opening which is capable of receiving the consumable 2 and which is also configured as the outlet for the air flow channel. In embodiments where the consumable 2 does not include a mouthpiece 22, the aerosol generation device may comprise a mouthpiece which is combined with or separate from an opening for inserting the consumable 2 into the heating chamber 11. For example, the opening for inserting the consumable 2 may have a lid which includes the mouthpiece.

The electrical power supply 12 may, for example, be a battery or may be a connection to an external power supply.

The control circuitry 13 may comprise general-purpose programmable circuitry or hard coded logic circuitry for controlling the heating chamber 11.

The control circuitry 13 may also comprise a temperature sensor for determining a temperature of the heating chamber 11. Alternatively the control circuitry 13 may estimate the temperature of the heating chamber 11 based on how it has recently controlled the heating chamber 11.

The control circuitry 13 may also comprise a user interface such as a button or slider for activating aerosol generation in the heating chamber or for controlling properties of the aerosol generation such as a time length of an aerosol generating session, or a temperature profile of how quickly the consumable 2 is heated or a peak temperature to which the consumable 2 is heated.

In use, the aerosol generation device 1 may be operated by:

- Providing the consumable 2 in the heating chamber 11 between the compression element 111 and the reaction surface 112. This may be performed by a user of the aerosol generation device.
- Operating the heating chamber 11 to raise a temperature of the heating chamber 11 to an aerosol generation temperature which is at least hot enough for an aerosol to be released from the aerosol substrate 21 of the consumable 2. Heat may be supplied by one or more heating elements 115 included with the heating chamber 11.
- Extracting the aerosol from the heating chamber 11. For example, the user may inhale from the mouthpiece 22.

Operating the heating chamber 11 to lower a temperature of the heating chamber 11 to an aerosol substrate release temperature. This may be achieved passively by ceasing heat supply to the heating chamber 11.

Removing the consumable 2 from the heating chamber 11. This may be performed by the user after the consumable 2 has been released.

In embodiments of the invention, the compression element 111 comprises a thermally active material configured such that at least part of the displacement of the compression element 111 occurs passively, according to a temperature of the heating chamber 11 and a thermal response characteristic of the thermally active material. In some embodiment, this passive displacement may be combined with an actively-controlled displacement such as a displacement driven by an actuator, although this is not essential.

In particular, the compression element 111 comprises a material which undergoes a change in a magnetic property in dependence upon a temperature of the material. For example, as will be shown with reference to specific embodiments, this change in magnetic property may be a phase transition from between two types of magnetic behaviour including ferromagnetic, paramagnetic, antiferromagnetic and diamagnetic behaviour. In the present description, "ferromagnetic" includes both ferromagnetic and ferromagnetic behaviour. Alternatively (although less preferably) the change in magnetic property may be a continuous variation in field strength without a phase transition. A phase transition is preferable because the transition can provide a relatively high instantaneous force so that displacement of the compression element can overcome, for example, friction or any stickiness associated with by-products of aerosol generation.

Figure 2A:
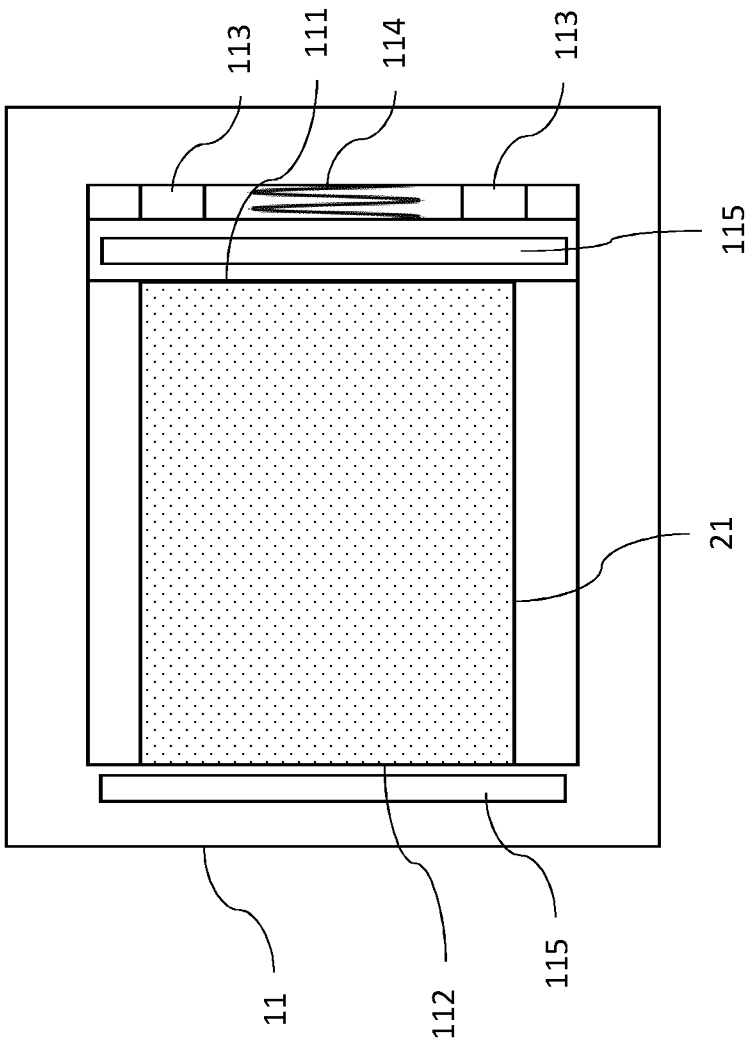
FIGS. 2A and 2B are schematic cross-sections of a heating chamber according to a first embodiment, containing an aerosol substrate.
Figure 2B:
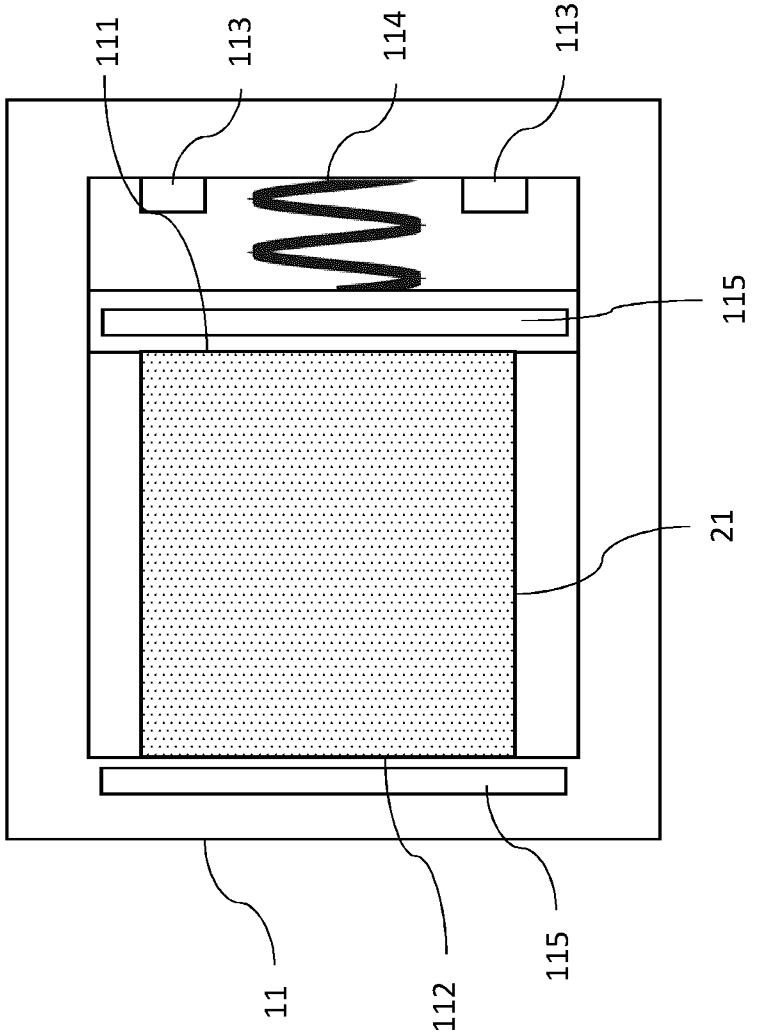

FIGS. 2A and 2B are schematic cross-sections of the heating chamber 11 showing additional detail of the compression element 111 and the reaction surface 112 in a first embodiment. The cross-section extends in a plane looking along a "long" direction of the consumable 2 as shown in FIG. 1.

In the first embodiment, the compression element 111 interacts magnetically with a magnetic interaction element 113. The magnetic interaction element 113 may for example be one or more portions of a first magnetic material that is attached to the interior of the heating chamber 11, such that the compression element 111 is arranged between the magnetic interaction element 113 and the reaction surface 112.

In this configuration, the thermally active material of the compression element 111 comprises a second magnetic material which may be the same as or different from the first magnetic material of the magnetic interaction element 113. During an aerosol generation session, a temperature of the heating chamber 11 is raised to an aerosol generation temperature at which aerosol is generated from the consumable 2. When the temperature in the heating chamber 11 rises during the aerosol generation session, at least one of the first and second magnetic materials undergoes a change in magnetic property, and a force of the interaction between the compression element 111 and the magnetic interaction 113 changes.

In the specific configuration of the first embodiment, when the heating chamber 11 is in a low temperature state illustrated in FIG. 2A, at least one of the first and second magnetic materials is ferromagnetic while the other of the first and second magnetic materials may be ferromagnetic or paramagnetic. As a result, the compression element 111 and the magnetic interaction element 113 experience an attractive force which biases the compression element 111 away from the reaction surface 112.

On the other hand, when the heating chamber 11 is in a high temperature state at the aerosol generation chamber, as illustrated in FIG. 2A, the first and second magnetic materials are both paramagnetic, and there is no significant attractive force between the compression 111 and the magnetic interaction element 113. In order to achieve this, the magnetic materials must be chosen such that, if they have a paramagnetic temperature range, the upper limit of this range (Curie temperature) is lower than the aerosol generation temperature.

When the heating chamber 11 cools down to below the Curie temperature (the aerosol substrate release temperature), the magnetic properties return to their low temperature states, and the compression element 111 and magnetic interaction element 113 again experience an attractive force to return the compression element 111 to an open position at which the consumable 2 can be inserted and removed.

As further illustrated in FIGS. 2A and 2B, a second force is be applied in order to cause displacement of the compression element 111 when the magnetic interaction is eliminated at high temperature above the Curie temperature. For example, a resilient element 114 (such as a spring) may be arranged adjacent to the magnetic interaction element 113 to provide a force opposed to the attraction between the magnetic interaction element 113 and the compression element 111, biasing the compression element 111 away from the reaction surface 112. When the magnetic attraction is removed, the resilient element 114 displaces the compression element 111 towards the reaction surface 112, causing compression of the aerosol substrate 21.

As further shown in FIGS. 2A and 2B, one or more heating elements 115 may be provided to supply heat into the chamber 11. The heating elements 115 may be any known type of heating element such as a combustible heating element or an electronic resistive heating element.

The heating element(s) 115 may be arranged in various positions around the heating chamber 11. For example, a heating element 115 may be arranged at the compression element 111 (either on a surface or comprised within the compression element 111). In this case, because the compression element 111 is configured to undergo displacement, it may be necessary to provide a flexible or sliding fuel/power supply to the heating element 115. However, because the compression element 111 is configured to compress the aerosol substrate 21, this positioning may have the benefit of improved thermal contact and more efficient heating of the substrate.

Alternatively or additionally, a heating element 115 may be provided in a fixed position such as a wall of the heating chamber, for example behind the compression element 111 (i.e. with the compression element between the heating element and the reaction surface), or at the reaction surface 112 (either located on the reaction surface 112 or embedded within the reaction surface 112).

Figure 3:
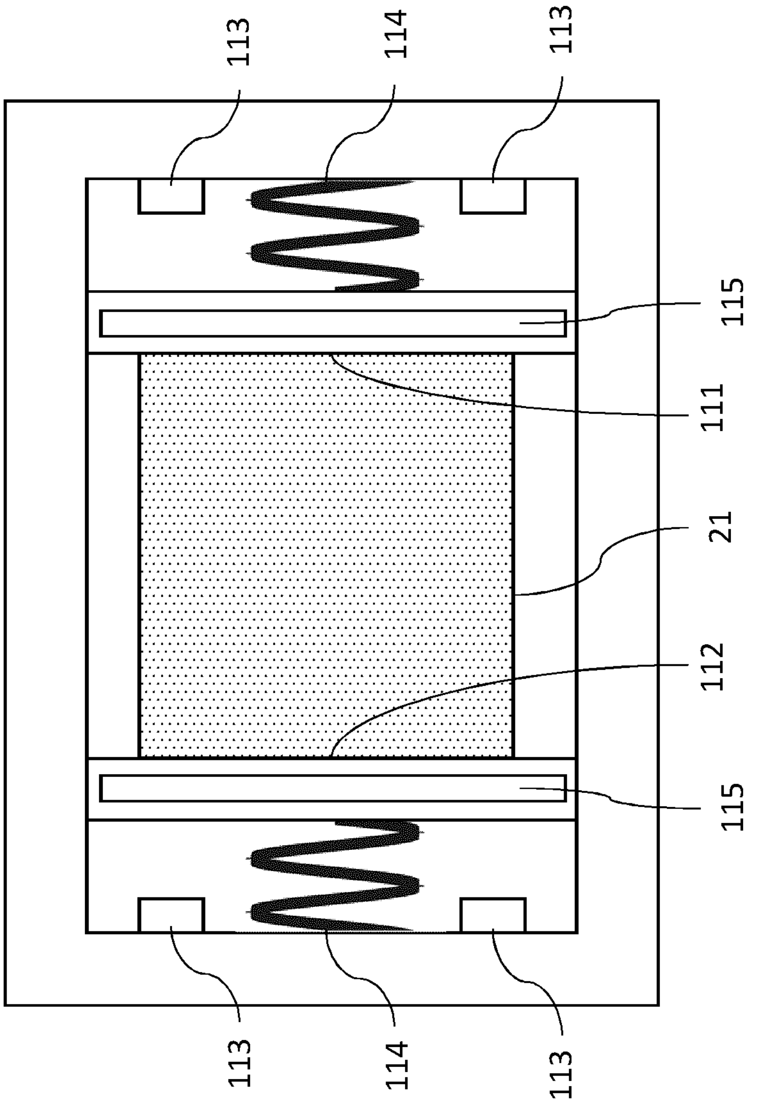
FIG. 3 is a schematic cross-section of a heating chamber according to a second embodiment, containing an aerosol substrate.

FIG. 3 illustrates a second embodiment of the heating chamber 11 as a variant of the first embodiment shown in FIGS. 2A and 2B. The second embodiment differs from the first embodiment in that the reaction surface is not a fixed surface, and is also configured to undergo displacement similar to that previously described for the compression element. In other words, the reaction surface 112 can be configured as a second compression element configured to undergo displacement according to the temperature of the heating chamber. In a simple case, the heating chamber 11 is substantially symmetric with the displacement of the second compression element 112 being configured to function in the same way as the first compression element 111.

More generally, the number of compression elements is not limited. For example, the chamber 11 may have a triangular configuration arranged to receive a consumable 2 between three compression elements arranged at 120 degree intervals around the consumable 2. In this case, the "reaction surface" function for each compression element is split between the other two compression elements.

Figure 4:
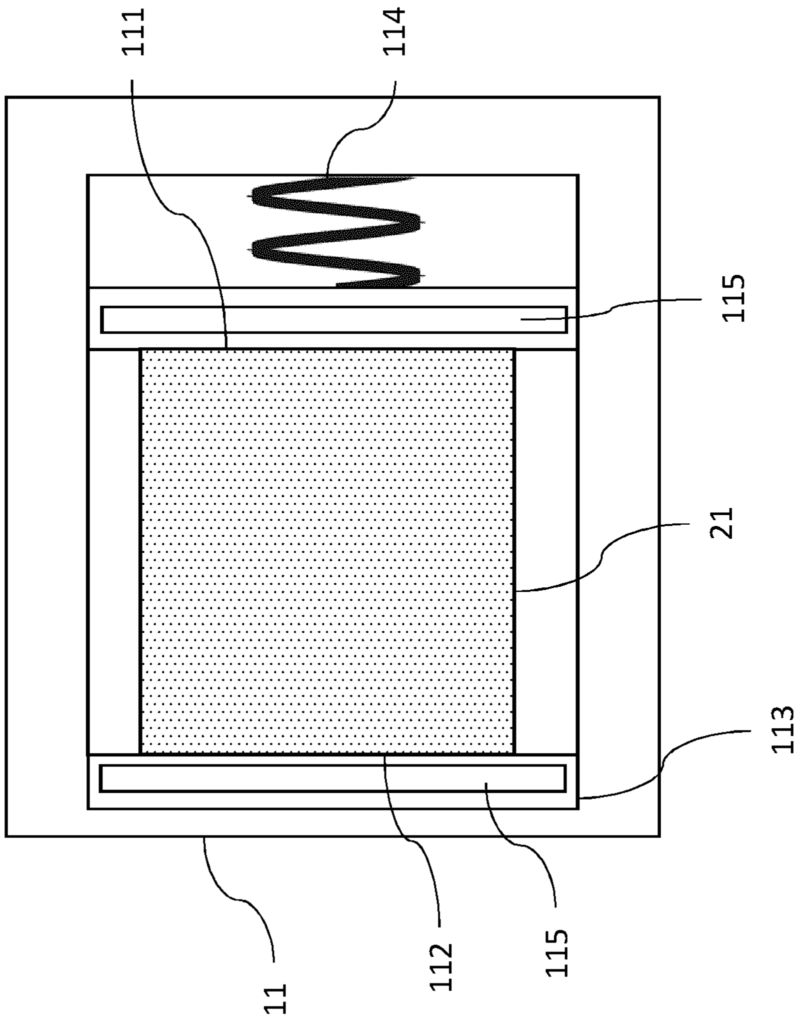
FIG. 4 is a schematic cross-section of a heating chamber according to a third embodiment, containing an aerosol substrate.

FIG. 4 illustrates an alternative arrangement in a third embodiment, as a variant of the first embodiment.

In the third embodiment, the magnetic interaction element 113 is arranged to face the compression element 111 across the heating chamber 11 such that the consumable 2 is received between the magnetic interaction element 113 and the compression element 111. The magnetic interaction element 113 in this case may be located adjacent to or combined with the reaction surface 112 (e.g. located on, within, or behind the reaction surface).

In the third embodiment, multiple types of magnetic configuration can be used.

In a first case, the compression element 111 and magnetic interaction element 113 can be configured to experience no magnetic force at low temperatures and to experience an attractive magnetic force at the aerosol generation temperature. This can be achieved by using a magnetic material that is antiferromagnetic at temperatures below a Neel temperature lower than the aerosol generation temperature in one of the compression element 111 and the magnetic interaction element 113, and by using a magnetic material that is ferromagnetic at the aerosol generation temperature in the other of the compression element 111 and the magnetic interaction element 113.

At the same time, in the first case, the resilient element 114 may be configured to bias the compression element 111 towards the open position in which the consumable 2 is released. As such, when the heating chamber 11 is at a low temperature (e.g. close to room temperature) the consumable 2 can be inserted and removed. Alternatively, since there is no magnetic force at low temperatures in this configuration, the resilient element 114 may be omitted, and it may be left to a user of the aerosol generation device to exert a minimal force to move the compression element 111 to an open position where the consumable 2 can be inserted and removed.

In a second case, the compression element 111 and magnetic interaction element 113 can be configured to experience a repulsive magnetic force at low temperatures, and to experience no magnetic force at the aerosol generation temperature.

This can be achieved by arranging two ferromagnetic materials to oppose each other in a repulsive configuration. More specifically, the compression element 111 can be arranged with a magnetic field aligned along a first direction and the magnetic interaction element 113 can be arranged with a magnetic field aligned along the reverse of the first direction. Provided that at least one of the first magnetic material used in the magnetic interaction element 113 and the second magnetic material used in the compression element 111 has a Curie temperature lower than the aerosol generation temperature, then the repulsive magnetic force is not present when the heating chamber 11 is at the aerosol generation temperature.

Alternatively, and more preferably, the second case can be achieved by using a ferromagnetic material and a strongly diamagnetic material, such that it is not necessary to align the fields. More specifically, a diamagnetic material will generate an opposing field regardless of an orientation of the magnetic field of the ferromagnetic material, and the ferromagnetic and diamagnetic materials will repel each other. Provided that the ferromagnetic material has a Curie temperature lower than the aerosol generation temperature, the repulsive force will not be present at the aerosol generation temperature.

In the second case, the resilient element 114 may be configured as in the first embodiment, with a bias to displace the compression element 111 toward the reaction surface 112.

Figure 5:
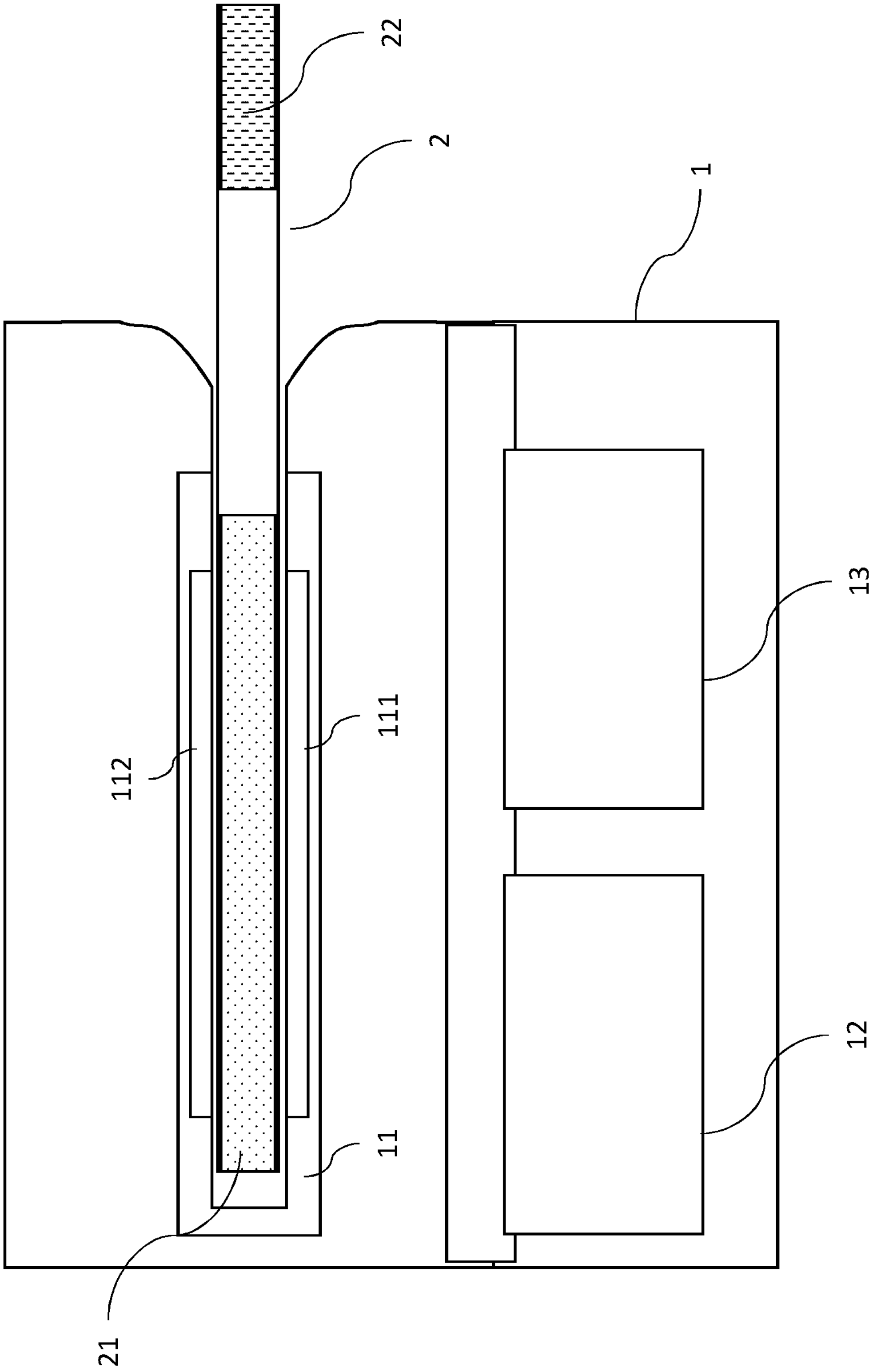
FIG. 5 is a schematic cross-section of an alternative aerosol generation device that has received a consumable.

FIG. 5 is a schematic cross-section of an alternative aerosol generation device 1 that has received a consumable 2. The aerosol generation device 1 and consumable 2 are largely similar to the features described with reference to FIG. 1, and only the differences are described here.

In FIG. 1, an air flow channel extends through the aerosol generation device 1 between an inlet and a separate outlet. However, as shown in FIG. 5, the inlet and outlet of the air flow channel may instead be a same point on the housing of the aerosol generation device, and the heating chamber 11 may have a pot-type configuration with only one opening. In this configuration, air is drawn into the aerosol substrate 21 through one part of the opening and drawn out of the aerosol substrate 21 through another part of the opening.

Figure 6:
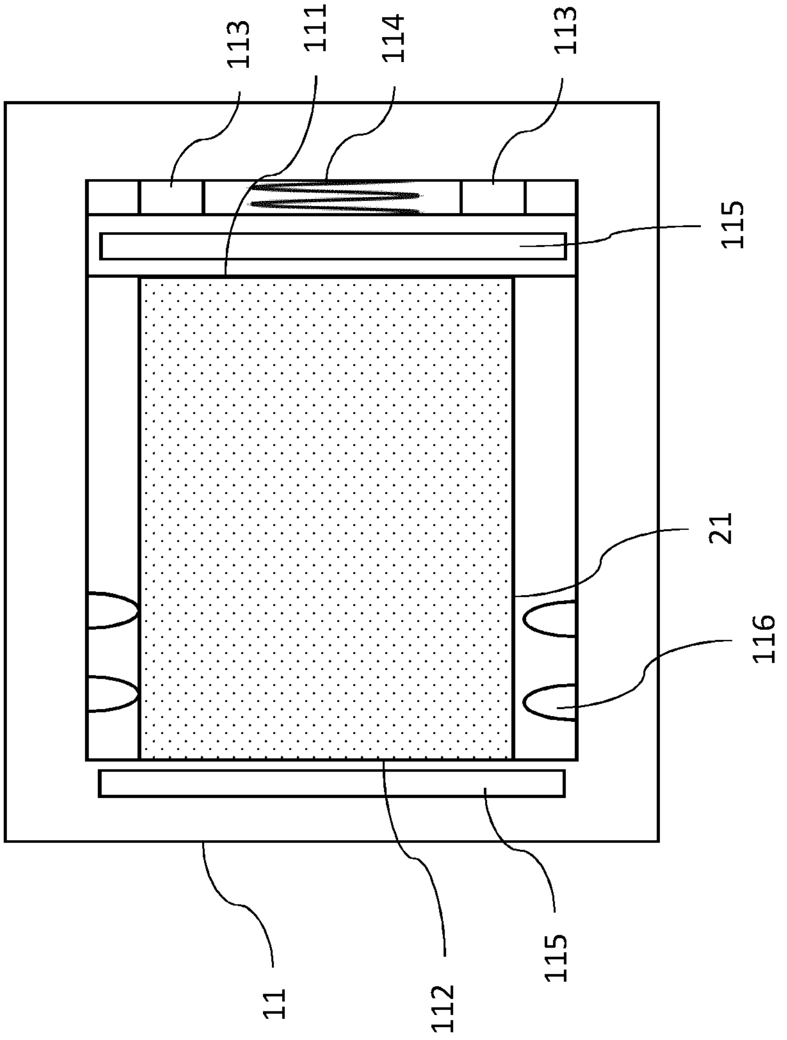
FIG. 6 is a schematic cross-section of a heating chamber including an air flow channel.

This difference in the air flow channel may require a change to the heating chamber 11 as illustrated in FIG. 6.

More specifically, as shown in FIG. 6, the heating chamber 11 may comprise one or more protrusions 116 configured to maintain a space between the consumable 2 and a wall of the heating chamber 11 so that air can flow around the consumable 2. The protrusions may for example be ribs extending along the heating chamber 11. The protrusion(s) 116 must be configured to avoid interfering with the displacement of the compression element 111. Nevertheless, the protrusion(s) 116 may provide a synergistic benefit of assisting with compression by restricting the cross-section of the heating chamber 11 available for the consumable 2 to occupy.

In one embodiment, the compression element 111 may itself be configured to maintain an air flow channel around the consumable 2, in the same way as the protrusions 116. Namely, the compression element 111 may be arranged between an in-flow part of the heating chamber 11 and a consumable-receiving part of the chamber 11. Thus, when the compression element 111 is displaced to compress the consumable 2, this has a secondary effect of increasing the cross-section of a channel for air to flow into the heating chamber 11. In such an embodiment, a pot-type heating chamber 11 may be used without providing a protrusion 116 separate from the compression element 111.

The invention claimed is:

1. A heating chamber for an aerosol generation device, the heating chamber comprising:

a magnetic interaction element comprising a first magnetic material;

a compression element comprising a thermally active material, wherein the thermally active material comprises a second magnetic material; and a reaction surface, wherein the heating chamber is adapted to receive an aerosol substrate between the compression element and the reaction surface, and the compression element is configured to compress the aerosol substrate against the reaction surface, wherein the compression element is configured to undergo displacement according to a temperature of the heating chamber and a thermal response characteristic of a magnetic property of the thermally active material changing a magnetic force between the first and second magnetic materials, wherein at least one of the first and second magnetic materials has a threshold temperature at which the material undergoes a magnetic phase transition, and wherein the heating chamber is configured to, during aerosol generation, raise the temperature of the heating chamber to an aerosol generation temperature above the threshold temperature.

2. The heating chamber according to claim 1, further comprising a heating element arranged at the compression element.

3. The heating chamber according to claim 1, further comprising a heating element arranged at the reaction surface.

4. The heating chamber according to claim 1, wherein the reaction surface is a second compression element configured to undergo displacement according to a temperature of the heating chamber.

5. The heating chamber according to claim 1, wherein:

the compression element is arranged between the magnetic interaction element and the reaction surface, and one of the first and second magnetic materials is ferromagnetic up to a Curie temperature lower than the aerosol generation temperature, and the other of the first and second magnetic materials is paramagnetic above the Curie temperature.

6. The heating chamber according to claim 1, wherein:

the magnetic interaction element is arranged at the reaction surface, and one of the first and second magnetic materials is antiferromagnetic up to a Néel temperature lower than the aerosol generation temperature, and the other of the first and second magnetic materials is ferromagnetic at the aerosol generation temperature.

7. The heating chamber according to claim 1, wherein:

the magnetic interaction element is arranged at the reaction surface, and one of the first and second magnetic materials is ferromagnetic up to a Curie temperature lower than the aerosol generation temperature, and the other of the first and second magnetic materials is diamagnetic.

8. The heating chamber according to claim 1, further comprising a resilient element configured to bias the compression element towards or away from the reaction surface.

9. An aerosol generation system comprising a heating chamber according to claim 1 and an aerosol substrate arranged between the compression element and the reaction surface.

10. A method of generating an aerosol comprising:

providing an aerosol substrate between the compression element and the reaction surface of a heating chamber according to claim 1;

operating the heating chamber to raise a temperature of the heating chamber to an aerosol generation temperature;

extracting an aerosol from the heating chamber;

operating the heating chamber to lower a temperature of the heating chamber to an aerosol substrate release temperature; and removing the aerosol substrate from the heating chamber.

11. An aerosol generation device comprising:

a heating chamber, wherein the heating chamber includes:

a magnetic interaction element comprising a first magnetic material;

a compression element comprising a thermally active material, wherein the thermally active material comprises a second magnetic material; and a reaction surface, wherein the heating chamber is adapted to receive an aerosol substrate between the compression element and the reaction surface, and the compression element is configured to compress the aerosol substrate against the reaction surface, wherein the compression element is configured to undergo displacement according to a temperature of the heating chamber and a thermal response characteristic of a magnetic property of the thermally active material changing a magnetic force between the first and second magnetic materials, wherein at least one of the first and second magnetic materials has a threshold temperature at which the material undergoes a magnetic phase transition, and wherein the heating chamber is configured to, during aerosol generation, raise the temperature of the heating chamber to an aerosol generation temperature above the threshold temperature.

12. The aerosol generation device according to claim 11, further comprising a heating element arranged at the compression element.

13. The aerosol generation device according to claim 11, further comprising a heating element arranged at the reaction surface.

14. The aerosol generation device according to claim 11, wherein the reaction surface is a second compression element configured to undergo displacement according to a temperature of the heating chamber.

15. The aerosol generation device according to claim 11, wherein:

the compression element is arranged between the magnetic interaction element and the reaction surface, and one of the first and second magnetic materials is ferromagnetic up to a Curie temperature lower than the aerosol generation temperature, and the other of the first and second magnetic materials is paramagnetic above the Curie temperature.

16. The aerosol generation device according to claim 11, wherein:

the magnetic interaction element is arranged at the reaction surface, and one of the first and second magnetic materials is antiferromagnetic up to a Néel temperature lower than the aerosol generation temperature, and the other of the first and second magnetic materials is ferromagnetic at the aerosol generation temperature.

17. The aerosol generation device according to claim 11, wherein:

the magnetic interaction element is arranged at the reaction surface, and one of the first and second magnetic materials is ferromagnetic up to a Curie temperature lower than the aerosol generation temperature, and the other of the first and second magnetic materials is diamagnetic.

18. The aerosol generation device according to claim 11, further comprising a resilient element configured to bias the compression element towards or away from the reaction surface.

* * * * *